United States Patent
Schwittay et al.

(10) Patent No.: US 7,598,339 B2
(45) Date of Patent: Oct. 6, 2009

(54) METHOD FOR REMOVING RESIDUAL MONOMERS FROM POLYOXYMETHYLENES

(75) Inventors: Claudius Schwittay, Heidelberg (DE); Elmar Stockelmann, Mannheim (DE); Johannes Heinemann, Mannheim (DE); Knut Zollner, Mannheim (DE); Achim Stammer, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 369 days.

(21) Appl. No.: 11/568,824

(22) PCT Filed: May 17, 2005

(86) PCT No.: PCT/EP2005/005335
§ 371 (c)(1),
(2), (4) Date: Nov. 8, 2006

(87) PCT Pub. No.: WO2005/113623
PCT Pub. Date: Dec. 1, 2005

(65) Prior Publication Data
US 2007/0191588 A1    Aug. 16, 2007

(30) Foreign Application Priority Data
May 19, 2004    (DE) .................. 10 2004 025 366

(51) Int. Cl.
*C08G 10/02*    (2006.01)

(52) U.S. Cl. ..................................... 528/480; 528/232

(58) Field of Classification Search ................. 528/232, 528/480
See application file for complete search history.

(56) References Cited

U.S. PATENT DOCUMENTS

| | | | | |
|---|---|---|---|---|
| 3,308,096 A | * | 3/1967 | Ivanov et al. | ............... 528/144 |
| 3,313,713 A | | 4/1967 | Martin | |
| 5,587,449 A | * | 12/1996 | Fleischer et al. | ............ 528/232 |
| 5,886,139 A | * | 3/1999 | Yamamoto et al. | .......... 528/410 |

FOREIGN PATENT DOCUMENTS

| | | |
|---|---|---|
| DE | 3231797 | 3/1984 |
| EP | 128739 | 12/1984 |
| EP | 129369 | 12/1984 |
| GB | 1048902 | 11/1966 |
| GB | 1205187 | 9/1970 |

* cited by examiner

*Primary Examiner*—Randy Gulakowski
*Assistant Examiner*—Shane Fang
(74) *Attorney, Agent, or Firm*—Connolly Bove Lodge & Hutz LLP

(57) ABSTRACT

A process for removing residual monomers from polyoxymethylene homo- or copolymers, comprising the following process steps:
a) the residual monomers are removed in gaseous form as vapors from the polymer in a devolatilization apparatus,
b) the residual monomer vapors are removed through a vapor pipe,
c) the residual monomers are condensed from the vapors in a condensation apparatus at from 1.09 to 102.4 bar and from 102 to 230° C., the temperature not falling below 102° C. at any point of the condensation apparatus, and those surfaces of the condensation apparatus which come into contact with the vapors being coated with a liquid film of condensed residual monomers.

13 Claims, No Drawings

METHOD FOR REMOVING RESIDUAL MONOMERS FROM POLYOXYMETHYLENES

CROSS-REFERENCE TO RELATED APPLICATION

This application is a National Stage entry under the PCT of International Application PCT/EP2005/005335 filed on May 17, 2005. International Application PCT/EP2005/005335 claims priority to German application 102004025366.8, filed on May 19, 2004. The entire contents of each of PCT/EP2005/005335 and 102004025366.8 are incorporated herein by reference.

The invention relates to a process for removing unconverted residual monomers from polyoxymethylene homo- or copolymers, comprising the following process steps:

a) the residual monomers are removed in gaseous form as vapors at a temperature of from 70 to 300° C. and a pressure of from 0.005 to 50 bar from the polymer in a devolatilization apparatus, b) the residual monomer vapors are removed through a vapors pipe, the vapor temperature being kept above the boiling point, c) the gaseous residual monomers are condensed from the vapors in a condensation apparatus, wherein in step c), the condensation apparatus is operated at a pressure of from 1.09 to 102.4 bar and a temperature of from 102 to 230° C., the temperature not falling below the minimum temperature of 102° C. at any point in the condensation apparatus, and wherein those surfaces of the condensation apparatus which come into contact with the vapors are coated with a liquid film which comprises condensed residual monomers.

The invention furthermore relates to the use of this process during or after the preparation of polyoxymethylene homo- or copolymers. The invention also relates to a process for the preparation of polyoxymethylene homo- or copolymers, wherein first suitable monomers are prepared or stored in a monomer plant, the monomers are then polymerized to said polymers in a polymerization reactor and, during or after this polymerization, the residual monomers present in the polymers are removed by the above process.

Finally, the invention relates to polyoxymethylene homo- or copolymers obtainable by the last-mentioned process.

Polyoxymethylene polymers (POM) are obtained by homo- or copolymerization of 1,3,5-trioxane (trioxane for short), formaldehyde or another formaldehyde source. The conversion is usually not complete; rather, the crude POM polymer still comprises up to 40% of unconverted monomers. Such residual monomers are, for example, trioxane and formaldehyde, and any concomitantly used comonomers, such as 1,3-dioxolane or ethylene oxide. The residual monomers are removed from the crude polymer by working up.

The invention starts from the process of DE-A 32 31 797 for working up trioxane from trioxane-containing oxymethylene polymers, which comprises the following steps:

A. removal of the gaseous trioxane vapors from the polymer in a devolatilization zone at from 70 to 300° C. and from 0.005 to 50 bar, B. removal of the vapors, the vapor temperature being above the dew point, C. if appropriate, compression of the vapors to above 1 bar, D. condensation of the gaseous trioxane in a condensation zone at above 1 bar, the uncondensable formaldehyde being removed in gaseous form, E. if appropriate, purification of the trioxane.

This process has the disadvantage that the trioxane removed can undergo spontaneous and undesired polymerization. This results in the formation of deposits of, for example, paraformaldehyde, which block the apparatuses during the condensation or working-up of the trioxane and which apparatuses then have to be cleaned by a complicated procedure after shut down of the production plant. Also see page 3 line 21, of said publication, according to which trioxane condensed on surfaces has a pronounced tendency to polymerization. In order to avoid this polymerization (polycondensation), the document teaches, on page 7, line 15 to page 8, line 5 and in the examples, the concomitant use of a polymerization inhibitor, for example water, alcohols, ammonia or amines, in the condensation zone.

According to said publication, the intended reuse of the condensed trioxane for the POM preparation is possible only when the inhibitor is overcompensated before the polymerization reaction by addition of corresponding amounts of polymerization initiator. This additional initiator dose makes the process more expensive. Alternatively, the publication teaches that the inhibitor may also be removed in a complicated manner by ion exchange, extraction or distillation, which likewise reduces the cost-efficiency of the process.

The publication teaches, on page 6, lines 23-24, that the residual monomer formaldehyde cannot be condensed in the condensation zone, and it is for this reason that it is removed in gaseous form. In the process of DE-A 32 31 797, the residual monomers trioxane and formaldehyde separated off are accordingly obtained as two different phases (trioxane in liquid form and formaldehyde in gaseous form), which complicates their recycling.

It was the object to remedy the disadvantages described. In particular, it was intended to provide a process for removing trioxane, formaldehyde and other residual monomers from polyoxymethylenes, which avoids the polymerization of the condensing residual monomers even without addition of polymerization inhibitors. It was therefore intended to be able to dispense with inhibitors.

Moreover, the process should simplify the removal of the formaldehyde. In particular, it should enable the formaldehyde to be condensed together with the trioxane as a liquid phase.

Accordingly the process defined at the outset for removing the residual monomers was found. In addition, said use of this process, the process mentioned for the preparation of the POM polymers and the POM polymers obtainable by the last-mentioned process were found. Preferred embodiments of the invention are described in the subclaims.

All stated pressures are absolute pressures, unless stated otherwise.

The polyoxymethylene homo- or copolymers (POM) from which the unconverted residual monomers are removed by the process according to the invention are known as such and are commercially available. The homopolymers are prepared by polymerization of formaldehyde or—preferably—trioxane; in the preparation of the copolymers, comonomers are also concomitantly used.

Very generally, such POM polymers comprise at least 50 mol % of repeating —$CH_2O$— units in the polymer main chain. Polyoxymethylene copolymers are preferred, in particular those which, in addition to the repeating —$CH_2O$— units, also comprise up to 50, preferably from 0.1 to 20, in particular from 0.3 to 10 mol % and very particularly preferably from 2 to 6 mol % of repeating units

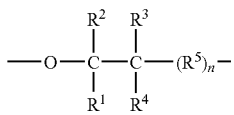

where $R^1$ to $R^4$, independently of one another, are a hydrogen atom, a $C_1$- to $C_4$-alkyl group or a halogen-substituted alkyl group having from 1 to 4 carbon atoms and $R^5$ is a —$CH_2$— or —$CH_2O$— or a $C_1$- to $C_4$-alkyl- or $C_1$- to $C_4$-haloalkyl-substituted methylene group or a corresponding oxymethylene group and n has a value in the range from 0 to 3. Advantageously, these groups can be introduced into the copolymers by ring opening of cyclic ethers. Preferred cyclic ethers are those of the formula

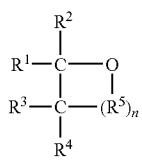

where $R^1$ to $R^5$ and n have the abovementioned meaning. Merely by way of example, ethylene oxide, 1,2-propylene oxide, 1,2-butylene oxide, 1,3-butylene oxide, 1,3-dioxane, 1,3-dioxolane and 1,3-dioxepan (=butanediol formal, BUFO) may be mentioned as cyclic ethers and linear oligoformals or polyformals, such as polydioxolane or polydioxepan, as comonomers.

Also suitable are oxymethylene terpolymers, which are prepared, for example, by reacting trioxane and one of the cyclic ethers described above with a third monomer, preferably bifunctional compounds of the formula

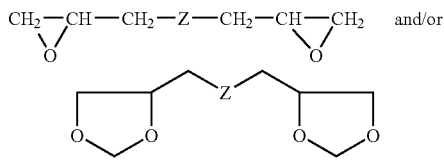

where Z is a chemical bond, —O— or —ORO— (R=$C_1$- to $C_8$-alkylene or $C_3$- to $C_8$-cycloalkylene).

Preferred monomers of this type are ethylene diglycide, diglycidyl ether and diethers of glycidyls and formaldehyde, dioxane or trioxane in the molar ratio 2:1 and diethers of 2 mol of glycidyl compound and 1 mol of an aliphatic diol having 2 to 8 carbon atoms, such as, for example, the diglycidyl ethers of ethylene glycol, 1,4-butanediol, 1,3-butanediol, cyclobutane-1,3-diol, 1,2-propanediol and cyclohexane-1,4-diol, to mention but a few examples.

Polyoxymethylene polymers which have been stabilized at the terminal group and have C—C or —O—$CH_3$ bonds at the chain ends are particularly preferred.

The preferred polyoxymethylene copolymers have melting points of at least 150° C. and molecular weights (weight average) $M_w$ in the range from 5000 to 300 000, preferably from 7000 to 250 000. Particularly preferred are POM copolymers having a nonuniformity ($M_w/M_n$) of from 2 to 15, preferably from 2 to 9. The measurements are carried out as a rule by gel permeation chromatography (GPC)-SEC (size exclusion chromatography), and the $M_n$ value (number average molecular weight) is generally determined by means of GPC-SEC.

The molecular weights of the polymer can, if appropriate, be adjusted to the desired values by means of the regulators customary in the trioxane polymerization. Suitable regulators are acetals or formals of monohydric alcohols, the alcohols themselves and small amounts of water which act as chain transfer agents, the presence of which water can as a rule never be completely avoided. The regulators are used in amounts of from 10 to 10 000 ppm, preferably from 100 to 1000 ppm.

Initiators (also referred to as catalysts) used are the cationic initiators customary in the trioxane polymerization. Protic acids, such as fluorinated or chlorinated alkanesulfonic and arylsulfonic acids, e.g. perchloric acid or trifluoromethanesulfonic acid, or Lewis acids, such as, for example, tin tetrachloride, arsenic pentafluoride, phosphorus pentafluoride and boron trifluoride, and their complex compounds and salt-like compounds, e.g. boron trifluoride etherates and triphenylmethylene hexafluorophosphate are suitable. The initiators (catalysts) are used in amounts from about 0.01 to 1000 ppm, preferably from 0.01 to 500 ppm and in particular from 0.01 to 200 ppm. In general, it is advisable to add the initiator in dilute form, preferably in concentrations of from 0.005 to 5% by weight. Solvents which may be used for this purpose are inert compounds, such as aliphatic or cycloaliphatic hydrocarbons, e.g. cyclohexane, halogenated aliphatic hydrocarbons, glycol ethers, etc. Triglyme is particularly preferred as a solvent (triethylene glycol dimethyl ether).

In addition to the initiators, cocatalysts may be concomitantly used. These are alcohols of any type, for example aliphatic alcohols having 2 to 20 carbon atoms, such as ter-tamyl alcohol, methanol, ethanol, propanol, butanol, pentanol or hexanol; aromatic alcohols having 2 to 30 carbon atoms, such as hydroquinone; halogenated alcohols having 2 to 20 carbon atoms, such as hexafluoroisopropanol; glycols of any type are very particularly preferred, in particular diethylene glycol and triethylene glycol; and aliphatic dihydroxy compounds, in particular diols having 2 to 6 carbon atoms, such as 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol.

Monomers, initiators, cocatalysts and, if appropriate, regulators can be premixed in any desired manner or added separately from one another to the polymerization reactor. Furthermore, the components may contain sterically hindered phenols, as described in EP-A 129369 or EP-A 128739, for stabilization.

Preferably, the polymerization mixture is deactivated directly after the polymerization, preferably without a phase change occurring. The deactivation of the initiator residues (catalyst residues) is effected as a rule by adding deactivators to the polymerization melt. Suitable deactivators are, for example, ammonia and primary, secondary or tertiary, aliphatic and aromatic amines, e.g. trialkylamines, such as triethylamine. Also suitable are basic salts, such as sodium carbonate and borax, and furthermore the carbonates and hydroxides of the alkali metals and alkaline earth metals, and also alcoholates, such as sodium ethanolate. The deactivators are usually added to the polymers in amounts of, preferably, from 0.01 ppmw (parts per million by weight) to 2% by weight. Furthermore, alkali metal or alkaline earth metal alkyls which have 2 to 30 carbon atoms in the alkyl radical are preferred as deactivators. Li, Mg and Na may be mentioned as particularly preferred metals, n-butyllithium being particularly preferred.

POM obtained from formaldehyde can be prepared in a conventional manner by polymerization in the gas phase, or in solution, by precipitation polymerization or by mass polymerization. POM obtained from trioxane are obtained as a rule by mass polymerization, it being possible to use any reactor having a good mixing effect for this purpose. The reaction can be carried out homogeneously, for example in a melt, or heterogeneously, for example as polymerization to give a solid or solid granules. For example, shell reactors, plowshare mixers, tubular reactors, List reactors, kneaders (e.g. Buss kneaders), extruders having, for example, one or two screws, and stirred reactors are suitable, it being possible for the reactors to have static or dynamic mixers.

In a mass polymerization, for example, in an extruder, a melt seal is formed by the molten polymers, with the result that volatile components remain in the extruder. The above monomers are metered into the polymer melt present in the extruder, together with or separately from the initiators (catalysts), at a preferred reaction mixture temperature of from 62 to 114° C. The monomers (trioxane) are preferably also metered in the molten state, for example at from 60 to 120° C. Owing to the exothermic polymerization reaction, it is usually necessary to melt the polymer in the extruder only at the start of the process; thereafter, the resulting heat of polymerization is sufficient to melt the POM polymer formed or to keep it molten.

The melt polymerization is effected as a rule at from 1.5 to 500 bar and from 130 to 300° C., and the residence time of the polymerization mixture in the reactor is usually from 0.1 to 20, preferably from 0.4 to 5, minutes. The polymerization is preferably carried out to a conversion of more than 30%, for example from 60 to 90%.

In each case, a crude POM which, as mentioned, comprises considerable proportions, for example, up to 40%, of unconverted residual monomers, in particular trioxane and formaldehyde, is obtained. Formaldehyde may be present in the crude POM even when only trioxane was used as a monomer, since it can form as a degradation product for the trioxane. Moreover, other oligomers of formaldehyde, for example the tetrameric tetroxane, may also be present.

In step a) of the process according to the invention, the residual monomers are removed in gaseous form as vapors at a temperature of from 70 to 300° C. and a pressure of from 0.005 to 50 bar from the polymer in a devolatilization apparatus. The pressure is preferably from 0.005 to 20, in particular from 0.05 to 5, bar.

Trioxane is preferably used as the monomer for the preparation of POM, for which reason the residual monomers removed comprise substantially trioxane, and also usually from 0.5 to 10% by weight of tetroxane and from 0.1 to 15% by weight of formaldehyde.

Preferably, no solvent or extracting agent is concomitantly used and no inert gas is metered in in step a). If the crude POM to be devolatilized is present in solid form, the devolatilization is preferably effected in conventional solid screws, paddle dryers or mixers. The temperature in the devolatilization apparatus is preferably from 115 to 140° C. in the case of solid POM.

The crude POM is preferably present as a polymer melt, and devolatilization apparatuses used in this case are those which create a large melt surface (melt/air phase boundary), for example single-screw or multiscrew extruders, kneaders or devolatilization pots (flash pots). In the case of such a POM melt, the temperature is preferably from 170 to 300° C.

In step b) of the process, the residual monomer vapors are removed through a vapor pipe, the vapor temperature being kept above the boiling point, e.g. at from 130 to 220°C. The vapor pipe conveys the vapors into the condensation apparatus and is, if appropriate, thermostated at said temperature by means of conventional heating apparatuses. If the devolatilization in step a) was carried out at at least 1 bar, the vapor removal is effected either by a compressor downstream of the condensation apparatus (step c)) or without additional mechanical apparatuses, by the temperature-related vapor pressure gradient prevailing between devolatilization apparatus and condensation apparatus.

If devolatilization was carried out under reduced pressure in step a), the vapors removed can be compressed in an optional step b') after step b) before they are passed into the condensation apparatus (step c)). Compression is preferably effected to a pressure above 1 bar, in particular from 1.1 to 5 bar. Suitable compressors are conventional apparatuses, such as turbo compressors, jet compressors or liquid ring compressors. Liquid ring compressors are preferably operated with liquid trioxane at from 65 to 115° C. as a barrier liquid, and compressor and condensation apparatus can be combined.

By keeping the temperature of the vapor pipe between devolatilization apparatus and condensation apparatus always above the boiling point of the vapors at the pressures prevailing in each case an undesired polymerization of the trioxane in the pipe, promoted inter alia by catalyst traces and formaldehyde, can be avoided, cf. DE-A 32 31 797.

In step c) of the process, the gaseous residual monomers are condensed from the vapors (by cooling) in a condensation apparatus. According to the invention, the condensation apparatus is operated at a pressure of from 1.09 to 102.4 bar and a temperature of from 102 to 230° C., the temperature not falling below the minimum temperature of 102° C. at any point in the condensation apparatus. Here, point means the spatial position or the location.

Surprisingly, it was found that the undesired polymerization of the residual monomers, in particular of the trioxane and of the formaldehyde, in the condensation apparatus can be reliably avoided if said pressure and temperature ranges are maintained during the condensation, and the condensation apparatus is at least at 102° C. at every point.

The condensation apparatus is preferably operated at a pressure of from 1.58 to 14.8 bar and a temperature of from 111 to 170° C., particularly preferably at a pressure of from 2.0 to 5 bar and a temperature of from 120 to 135° C.

Said pressures and temperatures are established in a conventional manner, for example by pressure control valves or upstream or downstream compressors or by suitable heating or cooling means, for example by heating or cooling jackets.

The lower pressure and temperature limits to be established preferably obey the following inequalities 1 and 2:

$$T > 18.417X^2 + 40.968X + 101.93 \tag{1}$$

$$p > 10^{\left(\frac{-3453}{(T+273.15)}+10.81\right)} \Big/ 100 + e^{\left(216.1826 - \frac{12102.17}{(T+273.15)} - 31.09473*\ln(273.15+T) + 0.03070786*(273.15+T)\right)} \Big/ 100000 \tag{2}$$

Here, the meanings are as follows:

T temperature in ° C.

p absolute pressure in bar

X given proportion of dissolved formaldehyde in trioxane, for example dissolved as molecular formaldehyde, as paraformaldehyde, as other dimers, trimers, tetramers or other oligomers, expressed as mass fraction X.

Also according to the invention, the condensation apparatus is designed and operated in such a way that those surfaces of the condensation apparatus which come into contact with the vapors (referred to below as contact surfaces for short) are coated with a liquid film which comprises condensed residual monomers.

This is ensured in particular by those condensation apparatuses which have no dead volumes, since the contact surface in the region of said dead volumes might not have such a liquid film or might have only a discontinuous film. It is believed that undesired paraformaldehyde forms on such surfaces which have not been wet.

Suitable condensation apparatus is a tubular condenser. It is designed, for example, as a simple tube without internals, whose wall is thermostated by a thermostating means, for example a heating or cooling jacket, to the suitable temperature. On the other hand, packed columns or columns having tray internals, as mentioned on page 6, lines 26-28, of DE-A 32 31 797, are generally less suitable since they may have troublesome dead volumes or surfaces which are not wet.

The condensation apparatus is preferably a tubular condenser, a film condenser or a scrubber tower. An externally heated tube which preferably has no internals is particularly preferred. The tube is preferably arranged perpendicularly and, also preferably, the gaseous residual monomers removed are passed into the tube from above. There, they condense on the tube wall (=contact surface) and form a liquid film (condensate) which runs down.

In order to improve the condensation efficiency, the cooling can be effected with the aid of liquid monomers, for example liquid trioxane. These liquid monomers may be, for example, either (already condensed) residual monomers, or monomers which have been added for the first time, i.e. fresh monomers, or mixtures of residual monomers and fresh monomers.

During the cooling with liquid monomers, liquid trioxane is passed as quench trioxane into the condensation apparatus, for example the tube. It is believed that a film of liquid quench trioxane forms on the condenser wall, the gaseous residual monomers (trioxane, formaldehyde, etc.) to be condensed undergoing condensation on said quench trioxane. The quench trioxane can be fed cocurrently with or countercurrently to the gaseous residual monomers, preferably cocurrently. A mixture of quench trioxane and condensed residual monomers is obtained at the outflow of the condensation apparatus, i.e. for example at the lower tube end, and is removed.

In addition to tubular and film condensers, scrubber towers are also preferred as a condensation apparatus; they are also referred to as spray condensers. In latter, drops or a spray mist are produced, and the condensation takes place not only on the contact surfaces of the tower but also on the liquid drops. The quench trioxane can be passed cocurrently or countercurrently in the film condenser or scrubber tower.

Of course, said pressure and temperature conditions also apply to the quench trioxane. In particular, the quench trioxane has a minimum temperature of 102° C.

Accordingly, in a preferred embodiment of the process in step c), the vapors are condensed by being brought into contact with liquid residual monomers or with a liquid mixture comprising residual monomers and fresh monomers.

The cooling by means of quench trioxane can be effected in an open or closed procedure. In the open procedure, the mixture of condensed residual monomers and added quench trioxane is removed completely from the condensation apparatus and, if appropriate, fed to further process steps, for example to a purification (see further below).

In the—preferred—closed procedure, a part of the mixture removed from the condensation apparatus is branched off, cooled to the required temperature, for example by means of a heat exchanger, and recycled as quench trioxane into the condensation apparatus, it being possible, if required, to meter in fresh trioxane. For example, a part of the mixture comprising quench trioxane and condensed trioxane and removed at the lower tube end can be cooled and recycled to the upper tube beginning.

It has surprisingly been found that, in the development of the condensation according to the invention, the residual monomers formaldehyde and other low-boiling compounds can also be separated off in a simple manner as a liquid and not, for example, as gas. This was not to be expected since DE-A 32 31 797, on page 6, lines 23-24 and page 7, lines 6-13, teaches that removal of formaldehyde can be effected only in gaseous form. It is assumed that, under the conditions according to the invention, the formaldehyde or the other low boilers condense on the liquid trioxane film or dissolve in the liquid trioxane.

In the condensation step c) of the process according to the invention, preferably, and in contrast to said publication, no inhibitors at all are required in order to prevent polymerization of the removed residual monomers in the condensation apparatus.

Preferably, therefore, neither water nor another inhibitor must be added before or during the condensation. Particularly preferably, no inhibitors are added even in steps a) and b), devolatilization and vapor removal. This does not prevent the concomitant use of inhibitors in the preparation of the crude POM. In this preferred embodiment, a very low water content of the trioxane of up to 15 ppm by weight, as is usual in the case of the trioxane used in industrial POM processes, is also not to be ruled out; such small amounts of water generally do not have an inhibitory effect.

Accordingly, in the process, preferably no inhibitors which would prevent polymerization of the residual monomers are added after step b) or in step c). This simplifies the process considerably and makes it more economical since no inhibitor has to be removed again by a complicated procedure or has to be overcompensated by additional amounts of initiator.

It is all the more surprising that, in spite of the lack of, for example, water as an inhibitor, the formaldehyde too can be condensed in the manner described. In the process according to DE-A 32 31 797, the quench trioxane comprises water as an inhibitor, and the person skilled in the art knows, for example from Walker, Formaldehyde, Am. Chem. Soc. Monograph Series No. 159, 3rd ed., Reinhold New York 1964, that formaldehyde is very soluble in water. It was therefore not to be expected that it would be possible to separate off formaldehyde as a liquid phase even in the absence of water, as is the case in the process according to the invention.

Above, trioxane also represents the other, stated residual monomers, such as formaldehyde, etc. The residual monomers are preferably selected from trioxane, formaldehyde, tetroxane, 1,3-dioxolane, 1,3-dioxepan, ethylene oxide and oligomers of formaldehyde.

The development, according to the invention, of the condensation in step c) reliably prevents the undesired polymerization of the residual monomers. Even if polymerization initiator was entrained in the devolatilization apparatus, which cannot always be avoided, and thus enters the condensation apparatus, it presents no problems there. Presumably, in the condensation designed according to the invention, a polymer which may form in the condensation apparatus dissolves in the condensed state instead of forming solid deposits. Volatile, more readily entrainable initiators can therefore also be used in the polymerization, and the procedure is not limited to the use of sparingly volatile initiators.

The residual monomers separated off in step c) are removed in a conventional manner and can preferably be reused as such directly, i.e. without further working up. However, if necessary, the condensed residual monomers obtained in step c) can be purified in a purification apparatus. This can be effected in purification or separation operations known per se, for example by distillation, rectification, pervaporation, sublimation, crystallization, adsorption, absorption, chemisorption, thermal diffusion, thickening, concentration, evaporating down, drying, freeze drying, freezing out, condensation, melting, electrophoresis, ion exchange, chromatography, complexing, chelation, etc. By preferably dispensing with inhibitors, such as water, etc., the purification, if it should be required at all, is however considerably simplified.

The invention furthermore relates to the use of the process described above for separating off residual monomers ("separation process" below) during or after the preparation of the polyoxymethylene homo- or copolymers (in short: POM).

In the preparation of POM, suitable monomers are usually first prepared in a monomer plant, for example trioxane from formaldehyde, and/or suitable monomers are stored. Thereafter, the monomers are transferred from the monomer plant into a polymerization reactor and polymerized there to give POM, as already described further above. The crude POM described, from which the unconverted residual monomers are separated off by the separation process according to the invention, is obtained. Residual monomers can also be separated off by the separation process according to the invention even during the polymerization to give POM, or this residual monomer separation according to the invention is carried out both during and after the polymerization.

Furthermore, the invention accordingly also relates to a process ("POM process" below) for the preparation of polyoxymethylene homo- or copolymers, wherein first suitable monomers are prepared or stored in a monomer plant, the monomers are then polymerized to said polymers in a polymerization reactor and, during or after this polymerization, the residual monomers present in the polymers are removed by the above separation process. The residual monomers can of course also be removed during and after the polymerization.

The POM process according to the invention accordingly comprises the separation process according to the invention as a process step.

Usually, the crude POM obtained is provided with conventional additional substances and processing assistants (additives) in the amounts customary for these substances, in an extruder or another suitable mixing apparatus. Such additives are, for example, lubricants or mold release agents, colorants, such as, for example, pigments or dyes, flameproofing agents, antioxidants, light stabilizers, fibrous and pulverulent fillers or reinforcing agents or antistatic agents, and other additional substances, or mixtures thereof.

In a preferred embodiment i), the residual monomers are freed from the residual monomers by the separation process according to the invention directly after the preparation of the crude POM, i.e. even before the addition of the additives on the extruder, for example by transporting the crude POM leaving the polymerization reactor into a devolatilization pot (flash pot) and separating off the residual monomers there according to the invention.

In another preferred embodiment ii), the crude POM is freed from the residual monomers by the separation process according to the invention only on addition of the additives on the extruder or the other mixing apparatus. The mixing apparatus for the addition of the additives may be identical to the devolatilization apparatus which is used in step a) of the separation process. For example, it is possible both to mix in the additives and to carry out step a) of the separation process i.e. to remove the residual monomers in gaseous form as vapors, on the same extruder.

In particular, the crude POM from the polymerization reactor can first be transported into a devolatilization pot and the residual monomers separated off there according to the invention, and/or the POM can then be provided with the additives on an extruder and at the same time the residual monomers separated off according to the invention. The above embodiments i) and ii) can therefore be combined.

The residual monomers removed by the separation process can—if appropriate after the purification which is described but is preferably not required—be used again as starting materials in the POM preparation, i.e. recycled to the POM process according to the invention. The target point of this recycling can be adapted to the production plant. For example, the residual monomers can be recycled directly into the polymerization reactor or into its feed, or they can be recycled into the monomer plant.

Consequently, in the POM process, the residual monomers removed are preferably recycled to the polymerization reactor or to the monomer plant. Of course, these two variants can also be combined.

Finally, the invention also relates to the polyoxymethylene homo- or copolymers obtainable by the POM process described.

The separation process according to the invention removes trioxane, formaldehyde and other residual monomers from polyoxymethylenes and, in the condensation, avoids the undesired polymerization of the condensing residual monomers even without addition of polymerization inhibitors. Moreover, it simplifies the removal of the formaldehyde which, like the trioxane, may be condensed as a liquid phase. The separation process according to the invention can therefore be operated with simpler apparatus and more economically.

EXAMPLES

Comparative example 1 below corresponds to example 2 from DE-A 32 31 797

Comparative Example 1 (Prior Art)

Pulverulent deactivated POM copolymer containing about 34% of unconverted monomers is continuously devolatilized in a solids conveying screw at about 1.01 bar and 130° C. The residence time of the crude polymer powder in the solids screw is about 15 minutes. After the devolatilization, the crude polymer still has a content of about 2.5% of volatile fractions, which is further reduced to the necessary specification values in the subsequent compounding. The vapors removed from the devolatilization zone consist of about 82% of trioxane, tetroxane and further cyclic oligomers of formaldehyde, acetals and about 8% of formaldehyde. The vapor pipe is kept at 135° C. In a turbo compressor, the vapors are compressed to about 2 bar and fed to a condensation zone. The compressor and the vapor pipe up to the condensation zone are thermostated at 150° C.

The condensation zone is in the form of a packed column. Quench trioxane, to which 2000 ppm of water as inhibitor have been added, flows countercurrently, in a mass ratio of about 20:1, to the vapors entering the packed column at a temperature of 135° C. The quench trioxane is fed to the top of the column at about 75° C. and leaves the column, together with the trioxane fraction precipitated from the vapors, at about 95° C. The uncondensed or undissolved fractions in an amount of about 3%, based on the amount of vapor used, leave the packed column at the top of the column and are recovered by conventional scrubbing with water.

An amount of trioxane corresponding to the condensed amount of vapor is branched off from the quench circulation for further processing. This trioxane contains 99.8% of polymerizable fractions and is purified in a working-up by distillation or extraction to polymerization quality.

The recycle trioxane is cooled in a cooler to the feed temperature of about 75° C. at the top of the column. No deposits are formed.

Said water content of the quench trioxane of 2000 ppm is obtained from the trioxane content of 99.8%: 100%-99.8%=0.2%≘2000 ppm.

The comparative example shows that, although the concomitant use of water as an inhibitor prevents the polymerization during the condensation, the water has to be removed in a complicated manner by distillation and extraction from the trioxane separated off, before the trioxane can be reused in the polymerization.

Comparative Example 2

Omission of the Inhibitor

The procedure was as described in Example 1, except that the quench trioxane used was a trioxane which comprised no water as inhibitor (apart from an unavoidable trace content of not more than 15 ppm of water, which however does not have an inhibitory effect). After a few minutes, deposits formed in the condensation zone. After a total of 30 minutes, the condensation zone was blocked and the plant had to be shut down.

The example shows that the process disclosed in DE-A 32 31 797 cannot be carried out without inhibitor.

The examples below are according to the invention.

Example 3

The procedure was as described in Example 2, i.e. inhibitor-free quench trioxane was used, with the following differences compared with Example 2:

The vapors were fed from the devolatilization zone directly via a vapor pipe (without compressor) to a condensation apparatus. The pressure in the devolatilization zone, the vapor pipe and the condensation apparatus was about 4 bar.

The condensation apparatus was not a packed column but a tubular condenser in the form of a perpendicular tube which had a length of 200 cm and an internal diameter of 10 cm, contained no internals and was provided with a heating jacket. The vapors to be condensed were passed into the tube at the upper end, as was the quench trioxane, the mass ratio of quench trioxane to vapors (i.e. quench ratio) being about 100:1.

The tube was heated to 105° C., and the temperature of the quench trioxane was likewise 105° C.

At the lower tube end, a mixture of quench trioxane and condensed vapors, comprising trioxane, formaldehyde and all readily volatile components, was removed. The temperature of this mixture was 105° C. At the upper tube end, no substances were removed in gaseous form.

A part of the mixture removed which corresponds to the condensed amount of vapor was branched off without further purification for reuse as monomers in the POM preparation, and the remaining part was fed as quench trioxane back to the condensation apparatus (quench circulation).

The plant exhibited no deposit formation at all even after 24 hours.

Example 4

The procedure was as in Example 3, but with the following differences: the mass ratio of quench trioxane to vapors (i.e. quench ratio) was about 20:1. The temperature of the mixture removed at the lower tube end was 115° C.

A part of the mixture removed which corresponds to the condensed amount of vapor was branched off without further purification for reuse as monomers in the POM preparation, and the remaining part was cooled to 105° C. and fed as quench trioxane back to the condensation apparatus (quench circulation).

Under these conditions, too, no deposits formed in the plant after 24 hours.

Example 5

Pulverulent, undeactivated POM copolymer containing about 34% of unconverted monomer was continuously devolatilized analogously to Example 1. After the devolatilization, the crude polymer still contained about 3% of volatile fractions. The vapors removed from the devolatilization zone contained about 80% of trioxane, tetroxane and further cyclic oligomers of formaldehyde, acetals and about 10% of formaldehyde. The vapor pipe was kept at 150° C. In a turbo compressor, the vapors were compressed to about 9 bar and fed to a condensation zone. The compressor and the vapor pipe up to the condensation apparatus were thermostated at 150° C.

The condensation apparatus was in the form of a tubular condenser. The vapors to be condensed were passed into the condenser at the upper end, as was the inhibitor-free quench trioxane. The vapor temperature was 200° C. and the temperature of the quench trioxane was 130° C. The quench ratio was about 100:1. A mixture of quench trioxane and condensed vapors was removed from the condenser, the temperature of the mixture being 133° C. At the upper tube end, no substances were removed in gaseous form.

A part of the mixture removed which corresponds to the condensed amount of vapor was branched off without further purification for reuse as monomers in the POM preparation at 133° C. under pressure, and the remaining part was cooled to 130° C. and fed as quench trioxane back to the condensation apparatus (quench circulation).

After operation for 24 hours, no formation of deposits or blockage was observed.

Example 6

A crude POM polymer melt containing about 38% of unconverted monomer was devolatilized in a ZSK 28 twin-screw extruder from Coperion at 240° C. and 0.2 bar to a residual content of about 0.3% of volatile fractions. The vapors, comprising about 84% of trioxane, other oligomers of formaldehyde, acetals and about 6% of formaldehyde and entrained crude polymer melt droplets, were fed via a vapor pipe thermostated at 180° C. to a turbo compressor, in which they were compressed to 15 bar. The turbo compressor and the connected vapor pipe to the condensation apparatus were thermostated at 200° C.

The condensation apparatus was in the form of a tubular condenser. The vapors to be condensed were passed into the condenser at the upper end, as was the inhibitor-free quench trioxane. The vapor temperature was 185° C. and the temperature of the quench trioxane was 125° C. The quench ratio was about 100:1. A mixture of quench trioxane and condensed vapors was removed from the condenser, the temperature of the mixture being 128° C. At the upper tube end, no substances were removed in gaseous form.

A part of the mixture removed which corresponds to the condensed amount of vapor was branched off without further purification for reuse as monomers in the POM preparation at 128° C. under pressure, and the remaining part was cooled to 125° C. and fed as quench trioxane back to the condensation apparatus (quench circulation).

After operation for 24 hours, no formation of deposits or blockage occurred.

In the POM preparation, a polyoxymethylene was prepared from 95.5% by weight of trioxane and 4.5% by weight of 1,3-dioxepan with 0.2 ppm by weight of trifluoromethane-sulfonic acid as initiator, the conversion being 73%. The polymer was devolatilized as described on a ZSK 30 extruder at 220° C. and 50 mbar and was provided with Irganox® 245 (ethylenebis(oxyethylene)bis[3-(5-tert-butyl-4-hydroxy-m-tolyl)propionate], CAS 036443-68-2) from Ciba as a stabilizer.

The melt flow index MFI of the polymer, determined according to DIN EN ISO 1133 at a melting point of 190° C. under nominal load of 2.16 kg, was 2.8 g/10 min.

The thermal stability of the polymer after storage for two hours in nitrogen at 220° C. was 99.78%.

Example 7

A crude POM polymer melt containing about 38% of unconverted monomer was let down in a devolatilization pot (flash pot). The temperature in the devolatilization pot was from 170 to 180° C. and the pressure about 4 bar. The vapors, comprising about 84% of trioxane, other oligomers of formaldehyde, acetals and about 6% of formaldehyde, were fed via a vapor pipe thermostated at 180° C. to a condensation apparatus.

The condensation apparatus was in the form of a film condenser. The vapors entering the condenser at a temperature of about 175° C. condensed on a film of quench trioxane which ran down the surface of the condenser. The quench trioxane was fed to the top of the condenser at about 135° C. The quench ratio was 100:1. A mixture of quench trioxane and condensed vapors was removed from the condenser, the temperature of the mixture being 137° C. No substances were removed in gaseous form.

A part of the mixture removed which corresponds to the condensed amount of vapor was branched off without further purification for reuse as monomers in the POM preparation at 137° C. under pressure, and the remaining part was cooled to 135° C. and fed as quench trioxane back to the condensation apparatus (quench circulation).

After operation for 24 hours, no formation of deposits or blockage occurred.

In the POM preparation, a polyoxymethylene was prepared from 95.5% by weight of trioxane and 4.5% by weight of 1,3-dioxepan with 0.2 ppm by weight of trifluoromethane-sulfonic acid as initiator, the conversion being 73%. The polymer was devolatilized as described on a ZSK 30 extruder at 220° C. and 70 mbar and provided with Irganox® 245 (CAS 036443-68-2) from Ciba as a stabilizer.

The melt flow index MFI of the polymer, determined according to DIN EN ISO 1133 at a melting point of 190° C. and a nominal load of 2.16 kg, was 4.9 g/10 min.

The thermal stability of the polymer on storage for two hours in nitrogen at 220° C. was 98.24%.

Examples 3 to 7 according to the invention show that, by means of the separation process according to the invention, the residual monomers can be separated off without problems. In particular, no deposits or blockages occurred in the condensation apparatus even after 24 hours, although no inhibitor was concomitantly used. Even the formaldehyde could be simultaneously separated off in a simple manner.

Examples 6 and 7 also illustrate the POM preparation process (POM process) which is likewise according to the invention and of which the separation process is a part.

We claim:

1. A process for removing unconverted residual monomers from polyoxymethylene homo- or copolymers, comprising the following process steps:
   a) the residual monomers are removed in gaseous form as vapors at a temperature of from 70 to 300° C. and a pressure of from 0.005 to 50 bar from the polymer in a devolatilization apparatus,
   b) the residual monomer vapors are removed through a vapor pipe, the vapor temperature being kept above the boiling point, from 130 and 220° C.,
   c) the gaseous residual monomers are condensed from the vapors in a condensation apparatus,
   wherein in step c), the condensation apparatus is operated at a pressure of from 2.0 to 5 bar and a temperature of from 120 to 135° C., and
   wherein those surfaces of the condensation apparatus which come into contact with the vapors are coated with a liquid film which comprises condensed residual monomers.

2. The process according to claim 1, wherein the condensation apparatus used is a tubular condenser, a film condenser or a scrubber tower.

3. The process according to claim 1, wherein, in step c), the vapors are condensed by being brought into contact with liquid residual monomers or with a liquid mixture comprising residual monomers and fresh monomers.

4. The process according to claim 1, wherein no inhibitors which would prevent polymerization of the residual monomers are added after step b) or in step c).

5. The process according to claim 1, wherein the residual monomers are selected from trioxane, formaldehyde, tetroxane, 1,3-dioxolane, 1,3-dioxepan, ethylene oxide and oligomers of formaldehyde.

6. A process for the preparation of polyoxymethylene homo- or copolymers, wherein first suitable monomers are prepared or stored in a monomer plant, the monomers are then polymerized to said polymers. in a polymerization reactor and, during or after this polymerization, the residual monomers present in the polymers are removed by the process according to claim 1.

7. The process according to claim 6, wherein the residual monomers removed are recycled to the polymerization reactor or to the monomer plant.

8. The process according to claim 2, wherein in step c), the vapors are condensed by being brought into contact with liquid residual monomers or with a liquid mixture comprising residual monomers and fresh monomers.

9. The process according to claim 2, wherein no inhibitors which would prevent polymerization of the residual monomers are added after step b) or in step c).

10. The process according to claim 3, wherein no inhibitors which would prevent polymerization of the residual monomers are added after step b) or in step c).

11. The process according to claim 2, wherein the residual monomers are selected from trioxane, formaldehyde, tetroxane, 1,3-dioxolane, 1,3-dioxepan, ethylene oxide and oligomers of formaldehyde.

12. The process according to claim 3, wherein the residual monomers are selected from trioxane, formaldehyde, tetroxane, 1,3-dioxolane, 1,3-dioxepan, ethylene oxide and oligomers of formaldehyde.

13. The process according to claim 4, wherein the residual monomers are selected from trioxane, formaldehyde, tetroxane, 1,3-dioxolane, 1,3-dioxepan, ethylene oxide and oligomers of formaldehyde.

* * * * *